United States Patent
Daum et al.

(10) Patent No.: US 7,170,405 B2
(45) Date of Patent: Jan. 30, 2007

(54) METHOD AND APPARATUS FOR INTERFACING A POWER LINE CARRIER AND AN APPLIANCE

(75) Inventors: Wolfgang Daum, Erie, PA (US); John S. Holmes, Sellersburg, IN (US); William H. Bicknell, Louisville, KY (US); Scott A. Horning, Overland Park, KS (US); Tanveer Iqbal, Louisville, KY (US); Scott C. Evans, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 591 days.

(21) Appl. No.: 09/747,442

(22) Filed: Dec. 26, 2000

(65) Prior Publication Data

US 2003/0007503 A1   Jan. 9, 2003

(51) Int. Cl.
*G08B 1/08* (2006.01)
(52) U.S. Cl. .................. 340/538.11; 340/310.11; 340/657; 324/500
(58) Field of Classification Search .......... 340/310.06, 340/310.01, 310.08; 709/223
See application file for complete search history.

(56) References Cited

U.S. PATENT DOCUMENTS

| | | | | |
|---|---|---|---|---|
| 3,569,826 A | * | 3/1971 | Burnett .................. 361/170 |
| 4,296,450 A | * | 10/1981 | Paice et al. ............... 361/50 |
| 4,471,399 A | * | 9/1984 | Udren ...................... 361/64 |
| 5,051,720 A | | 9/1991 | Kittirutsunetorn |
| 5,079,688 A | * | 1/1992 | Kido ...................... 363/125 |
| 5,436,510 A | | 7/1995 | Gilbert |
| 5,467,263 A | | 11/1995 | Gilbert |
| 5,565,783 A | * | 10/1996 | Lau et al. ................. 324/522 |
| 5,570,085 A | | 10/1996 | Bertsch |
| 5,576,700 A | | 11/1996 | Davis et al. |
| 5,625,863 A | | 4/1997 | Abraham |
| 5,630,204 A | | 5/1997 | Hylton et al. |
| 5,684,826 A | | 11/1997 | Ratner |
| 5,706,191 A | | 1/1998 | Bassett et al. |
| 5,729,145 A | * | 3/1998 | Blades .................... 324/536 |
| 5,761,092 A | | 6/1998 | Bunting |
| 5,777,769 A | | 7/1998 | Coutinho |
| 5,818,821 A | | 10/1998 | Schurig |
| 5,838,226 A | | 11/1998 | Houggy et al. |
| 5,842,032 A | | 11/1998 | Bertsch |
| 5,848,054 A | | 12/1998 | Mosebrook et al. |
| 5,856,776 A | | 1/1999 | Armstrong et al. |
| 5,870,016 A | | 2/1999 | Shrestha |

(Continued)

FOREIGN PATENT DOCUMENTS

EP   0 632 602 B1   12/2001

OTHER PUBLICATIONS

International Search Report, dated Mar. 27, 2003, Application No. PCT/US 01/49843, 6 pages.

*Primary Examiner*—Benjamin C. Lee
(74) *Attorney, Agent, or Firm*—Armstrong Teasdale LLP

(57) ABSTRACT

A method and apparatus for communicating between an appliance and a power line carrier communication system includes at least one power line carrier connection, at least one appliance connection, and processing circuitry for translating between an appliance communication protocol and a power line carrier communication protocol. The method and apparatus allow bidirectional communication between power line carrier and apparatus.

15 Claims, 5 Drawing Sheets

U.S. PATENT DOCUMENTS

| | | | |
|---|---|---|---|
| 5,892,430 A * | 4/1999 | Wiesman et al. | 340/538.16 |
| 5,892,758 A | 4/1999 | Argyroudis | |
| 5,898,387 A | 4/1999 | Davis et al. | |
| 5,903,326 A | 5/1999 | Lee | |
| 5,903,594 A * | 5/1999 | Saulnier et al. | 375/130 |
| 5,905,442 A | 5/1999 | Mosebrook et al. | |
| 5,922,047 A | 7/1999 | Newlin et al. | |
| 5,924,892 A | 7/1999 | Ferracina | |
| 5,927,598 A | 7/1999 | Broe | |
| 5,933,071 A | 8/1999 | Brown | |
| 5,938,757 A | 8/1999 | Bertsch | |
| 5,940,387 A | 8/1999 | Humpleman | |
| 5,949,327 A | 9/1999 | Brown | |
| 5,952,914 A | 9/1999 | Wynn | |
| 5,963,406 A | 10/1999 | Neiger et al. | |
| 5,994,998 A | 11/1999 | Fisher et al. | |
| 6,002,669 A | 12/1999 | White | |
| 6,006,167 A | 12/1999 | Bunting | |
| 6,011,579 A | 1/2000 | Newlin | |
| 6,014,386 A | 1/2000 | Abraham | |
| 6,040,759 A | 3/2000 | Sanderson | |
| 6,052,750 A | 4/2000 | Lea | |
| 6,058,355 A | 5/2000 | Ahmed et al. | |
| 6,061,604 A | 5/2000 | Russ et al. | |
| 6,085,236 A | 7/2000 | Lea | |
| 6,088,205 A | 7/2000 | Neiger et al. | |
| 6,130,896 A | 10/2000 | Lueker et al. | |
| 6,229,433 B1 * | 5/2001 | Rye et al. | 340/310.01 |
| 6,311,105 B1 * | 10/2001 | Budike, Jr. | 700/291 |
| 6,545,481 B1 * | 4/2003 | Emberty et al. | 324/521 |
| 6,587,739 B1 * | 7/2003 | Abrams et al. | 700/83 |
| 6,609,204 B1 * | 8/2003 | Olarig et al. | 713/200 |
| 6,731,201 B1 * | 5/2004 | Bailey et al. | 340/310.01 |
| 6,961,641 B1 * | 11/2005 | Forth et al. | 700/295 |
| 2002/0011923 A1 * | 1/2002 | Cunningham et al. | 340/310.01 |
| 2002/0129113 A1 * | 9/2002 | Larsson | 709/208 |

\* cited by examiner

METHOD AND APPARATUS FOR INTERFACING A POWER LINE CARRIER AND AN APPLIANCE

BACKGROUND OF THE INVENTION

The present invention generally relates to a communications interface, and in particular relates to a communications interface between an appliance and a power line carrier communication system.

The typical home, office building, or commercial establishment contains several appliances, including refrigerators, microwave ovens, ovens, stoves, heating systems, cooling systems, and the like. Modem appliances are much more sophisticated than their early counterparts, and often include microcontrollers or microprocessors that allow the appliance to be programmed, reprogrammed, and provide diagnostic information, as examples.

The Internet has given rise to worldwide connectivity for many types of devices. Appliances, however, only have traditional standalone capability. Three primary communication technologies may be used to provide appliance connectivity: hard wiring, power line carrier (PLC), and wireless.

Hard wiring (including for example RS-232, RS-485, Ethernet, USB, HomePNA, and industrial twisted pair networks) offers superior performance capability (when measured in terms of speed, noise immunity, and the like) at an effective cost. However, a drawback is that additional wiring is required to a home or business. Hard wiring thus poses the significant problem of retrofitting networked appliances into existing homes and businesses and increases cost for new structures.

PLC uses a 120V or 240V AC power line as a carrier for networking data by modulating the networking data on a high frequency carrier. The high frequency carrier is usually between 100–400 kHz to keep it below the range of FCC regulation. Although older technologies, such as X10, have achieved some market acceptance in lighting applications, they are generally deemed too slow and unreliable for major appliance networking needs. However, newer PLC technologies, such as CEBus and LonWorks, are now commercially available and provide improved data rates and noise immunity at reasonable cost.

Wireless technologies (such as IEEE 802.11, Bluetooth, HomeRF, and the like) solve the problem of additional wiring by modulating data onto a radio frequency carrier (e.g., at 2.4 GHz) that is broadcast via antenna to desired recipients. Wireless approaches may offer higher bandwidth than PLC technologies currently available, but they do so at a higher cost. Furthermore, since most major appliances are packaged in a sheet steel enclosure (which makes an effective RF shield), antenna placement may be difficult. Cost effective wireless technologies are also subject to distance limitations, potential interference, and poor reception zones that can often render their use in the home with large, immobile appliances impossible.

Therefore, even though PLC technologies are still emerging, they may offer the best balance of cost and performance in appliance networking. As such, a need exists to develop an appliance communication controller that interfaces appliances to an AC power line for communicating across the power line.

BRIEF SUMMARY OF THE INVENTION

A preferred embodiment of the present invention provides a communication interface for interfacing an appliance with a power line carrier communication system. The communication interface includes at least one power line connection for coupling the communication interface to a power line. The communication interface also includes at least one appliance communication connection for coupling said communication interface to an appliance, and a signal processor for processing a power line carrier transmission. The communication interface further comprises a processing circuit for translating between a power line carrier communication protocol and an appliance communication protocol.

Another preferred embodiment of the present invention provides a method of communicating between an appliance and a power line carrier. The method of communicating comprises interfacing with at least one power line carrier, interfacing with at least one appliance, processing a power line carrier transmission, and translating between a power line carrier communication protocol and an appliance communication protocol.

DETAILED DESCRIPTION OF THE INVENTION

Figure 1:
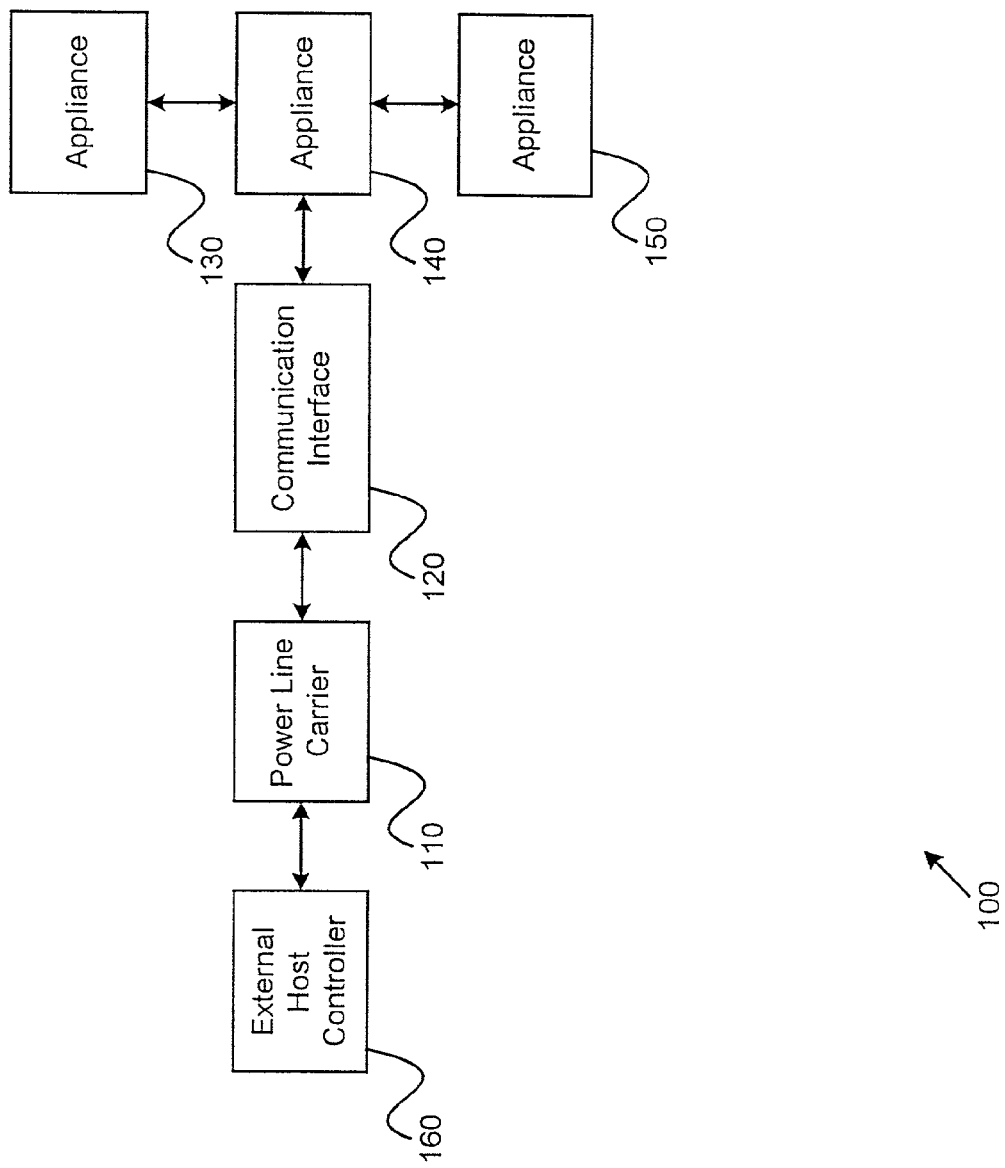
FIG. 1 illustrates a system for interfacing between a power line and an appliance.

FIG. 1 illustrates an appliance communication system 100 for connecting a power line carrier (PLC) 110 and appliances 130, 140, 150 using a communications interface 120 that provides for bidirectional transmission of data between the PLC 110 and at least one appliance 130–150. The appliances 130–150 may be, as examples, a refrigerator, microwave oven, convection oven, stove, heating system, or cooling system. The PLC 110 may be, as examples, 120 volt (120V) AC (alternating current) power or 240 volt (240V) AC power lines. An external host controller (EHC) 160 communicates with the appliances 130–150 through the PLC 110. The EHC 160 may be, as examples, a personal computer, laptop computer remote control operating center, dedicated service tool, and the like.

Figure 2:
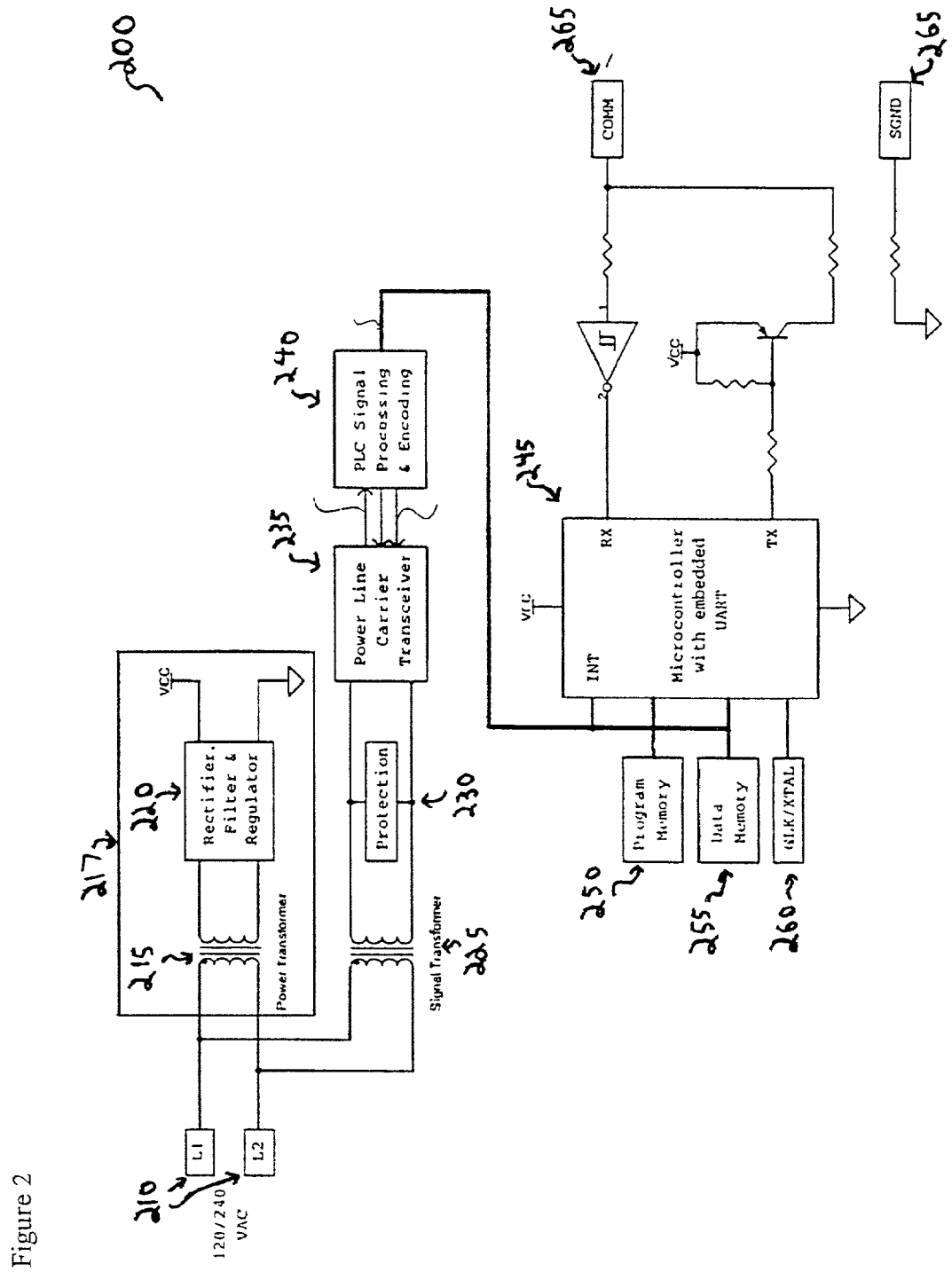
FIG. 2 shows a communications interface between an appliance and a power line carrier communication system.

A detailed diagram of the communications interface 120 is shown in FIG. 2. The communications interface 200 comprises two connections 210 for 120V or 240V AC power lines. The communications interface 200 also includes a transformer based power supply 217. As shown, the transformer based power supply 217 comprises a transformer 215 and a rectifier, filter and regulator 220. The communications interface 200 also includes a signal transformer 225 and line protector 230. The communications interface 200 further includes a PLC transceiver 235 and a PLC signal processing and encoding unit 240 (referred to below as the PLC signal processor). The communications interface 200 includes a communication processor 245. The communications interface 200 may also include a program memory 250, a data memory 255, and a clock generator 260. The communications interface 200 further comprises connections 265 for appliance communication. In a preferred embodiment, one of the connections is a serial signal (COMM) connection and the other connection is a signal ground (SGND) connection.

The transformer 215 may be implemented as a power transformer such as those commercially available from Signal. The rectifier, filter and regulator 220 may be implemented using Texas Instruments 1N4004 diodes, standard filter capacitors such as Rubicon 4700 uF capacitor and a Toshiba 78M05 regulator. The signal transformer 225 may be implemented as a toroidal signal transformer such as those commercially available from Signal. The line protector 230 may be implemented as a gas tube such as those manufactured by Siemens. The PLC transceiver 235 and the PLC signal processor 240 may be implemented using PLC integrated circuits manufactured by Phillips. The communication processor 245 may be implemented as a commercially available microcontroller such as the Hitachi H8-3644.

The connections 210 couple to an AC power line (e.g., 120V or 240V) that provides a power line carrier channel. A transformer based power supply 217 is connected to the connections 210. The transformer based power supply 217 includes a power transformer 215 and a rectifier, filter and regulator 220 and generates logic level supplies for electronic signal processing and logic. The transformer based power supply 217 also provides electrical isolation of electronic signal processing and logic from the AC power line. Alternative embodiments may use galvanically isolated switching power supplies or low cost resistive or capacitive dropping power supplies that provide different amounts of electrical isolation.

The connections 210 also connect to the signal transformer 225. The signal transformer 225 couples a modulated carrier frequency signal from the connections 210 to a PLC transceiver 235. The line protector 230 provides electrical isolation of the rest of the system from the AC line. Preferably, the line protector 230 is located between the signal transformer 225 and the PLC transceiver 235. Transmission between the PLC transceiver 235 and the PLC signal processor 240 is generally bidirectional, but may be unidirectional in certain applications.

The output of the PLC signal processor 240 feeds the communication processor 245. Preferably, the communication processor 245 includes a general purpose universal asynchronous receiver transmitter (UART) that communicates with the appliance through a communications channel connected through the connections 265. In a preferred embodiment, the UART establishes serial bidirectional communication with the appliance communications channel, for example, by changing the transmitter to a high impedance state when not transmitting.

The communication processor 245 connects to a program memory 250 that stores instructions for execution by the communication processor 245. The communication processor 245 also connects to a data memory 255 that, for example, buffers messages. The program memory 250 and data memory 255 may work together to buffer messages and to translate between a power line carrier communication protocol and an appliance protocol.

In a preferred embodiment, a serial communication bus is used when communicating between two or more boards, microcontrollers, or other equipment (devices) distributed among one or more platforms (e.g., an appliance and a communications interface). The serial communications bus may be a single line bus comprising a physical layer, a data-link layer, and an application layer. The serial communication bus allows on demand communications in a multi-master environment. The multi-master environment allows any device in the system to request information or actions from any other device in the system at any time once the device successfully attains bus control through arbitration.

The serial communication bus standard uses a collision detection technique to determine when a communications port is free or in use and when a collision has occurred. A collision occurs when two or more masters attempt to use the communications bus at the same time. A collision may be detected since the transmit and receive ports on the communication processor 245 are connected to the same bus wire. Control of interrupts associated with the communications port allows collision detection to be an interrupt driven activity. The protocol is a byte-oriented protocol. A higher level protocol determines the length and content of packets comprising messages. The following state table (Table 1) describes the preferred functionality of the serial communication protocol.

TABLE 1

Physical Communication Protocol State Table

| State | Action | Result | Next State |
| --- | --- | --- | --- |
| 1 | Are there bytes to send? | Yes | 2 |
|   |   | No | 1 |
| 2 | Check bus activity | Busy | 6 |
|   |   | Free | 3 |
| 3 | Send Byte |   | 4 |
| 4 | Does byte sent = byte received? | Yes | 1 |
|   |   | No | 5 |
| 5 | Delay 3 to 8 byte times | Complete | 1 |
| 6 | Delay 5 byte times | Complete | 1 |

In the two delay states, 5 and 6, a byte time is defined as the amount of time required to transmit a single byte on the communications bus. The byte time is determined by the baud rate, number of data bits, number of stop bits, and a parity bit, if used.

The variable delay period shown in state five is intended to make the restart delay time random. If a collision does occur, the two bus masters preferably do not delay the same amount of time before retrying transmission. The variable delay may reduce the possibility of subsequent collisions by the bus two masters. The variable delay period may be determined by a pseudo random number process, for example.

The data-link layer defines information that moves across the bus in any given packet of data. The bytes defined in the data-link layer do not necessarily have a one to one correlation with the bytes in the physical layer. Many physical devices have bits in the physical layer that implement the functions of some of the bytes in the data-link layer. The data-link layer may be generic so that the data-link layer and the application layer need not change even if the physical device is redesigned.

The protocol may be used in a master/slave environment, for example, in a small network where one device can be a master through one communication cycle and then become a slave for another communication cycle.

A master device uses a command to request action from a slave. A command may be structured in a packet as shown in Table 2 (note that the number of bytes may vary depending on need):

TABLE 2

Command Data Packet

| STX | Address | Packet Length | Command | Data | CRC | ETX |
|---|---|---|---|---|---|---|
| 1 byte | 1 byte | 1 byte | 1 byte | N bytes | 2 bytes | 1 byte | where, in a preferred embodiment:

STX (start transmission) is one byte with a value of 0x02. To determine whether an STX is valid, the protocol checks whether an ACK (acknowledgment) byte follows and if yes, the 0x02 is in the middle of a transmission and should not be interpreted as an STX;

Address is one byte and each device has one effective address;

Packet Length is the number of bytes in the packet including STX, Address, Packet Length, Command, Data, CRC, and ETX. The packet length value is 7–n, where n is the number of data bytes;

Command is one byte defined by the application layer;

Data may be zero, one, or multiple bytes as defined in the application layer, except for the case of a request in which the first data byte will be the master's address so the slave will know which device to respond to;

CRC (cyclic redundancy code) is a 16-bit CRC. The CRC is computed on all bytes of a packet except the STX, the CRC byte pair and the ETX; and ETX (end transmission) is one byte with a value of 0x03.

The protocol, including ACKs, is given in Tables 1–3. At any point in the process where an ACK can be sent a NAK (no acknowledgment) may be sent instead. If a NAK is transmitted, the communication sequence is aborted at that point. The master then has an option of re-starting the sequence (application dependent). A NAK is preferably transmitted in response to a received ETX when the computed packet CRC does not match the transmitted packet CRC. An additional ACK is sent at the end of each packet. In a preferred embodiment, an ACK is one byte with a value of 0x06.

In a preferred embodiment, a NAK is one-byte with a value of 0x15.

Tables 3–5 assume that time increments with each row of the table. Up to hundreds of milliseconds of delay may be tolerated for any expected event, such as, an ACK response to a transmitted byte, or the reception of the next byte of an incomplete packet. The arrow indicates the data direction. For the request sequence and response to request sequence, the first data byte is the transmitter's address.

TABLE 3

Command Sequence

| Master | | Slave | |
|---|---|---|---|
| STX | [0 x 02] | | |
| Slave Address | 1 byte | | |
| | | [0 x 06] | ACK |
| Packet Length | 1 byte | | |
| | | [0 x 06] | ACK |
| Command | 1 byte | | |
| | | [0 x 06] | ACK |
| Data Byte 1 | 1 byte | | |
| | | [0 x 06] | ACK |

TABLE 3-continued

Command Sequence

| Master | | Slave | |
|---|---|---|---|
| Data Byte 2 | 1 byte | | |
| | | [0 x 06] | ACK |
| Data Byte n | 1 byte | | |
| | | [0 x 06] | ACK |
| CRC MSB | 1 byte | | |
| | | [0 x 06] | ACK |
| CRC LSB | 1 byte | | |
| | | [0 x 06] | ACK |
| ETX | [0 x 03] | | |
| | | [0 x 06] | ACK |
| | | [0 x 06] | ACK |

TABLE 4

Request Sequence

| Requestor | | Requestee | |
|---|---|---|---|
| STX | [0 x 02] | | |
| Request Address | 1 byte | | |
| | | [0 x 06] | ACK |
| Packet Length | 1 byte | | |
| | | [0 x 06] | ACK |
| Request Command | 1 byte | | |
| | | [0 x 06] | ACK |
| Data Byte 1 - Requestor's Address (Transmitter) | 1 byte | | |
| | | [0 x 06] | ACK |
| Data Byte 2 | 1 byte | | |
| | | [0 x 06] | ACK |
| Data Byte n | 1 byte | | |
| | | [0 x 06] | ACK |
| CRC MSB | 1 byte | | |
| | | [0 x 06] | ACK |
| CRC LSB | 1 byte | | |
| | | [0 x 06] | ACK |
| ETX | [0 x 03] | | |
| | | [0 x 06] | ACK |
| | | [0 x 06] | ACK |

TABLE 5

Response to Request Sequence

| Requestee | | Requestor | |
|---|---|---|---|
| STX | [0 x 02] | | |
| Requestor's Address | 1 byte | | |
| | | [0 x 06] | ACK |
| Packet Length | 1 byte | | |
| | | [0 x 06] | ACK |
| Command to which Requestee is Responding | 1 byte | | |
| | | [0 x 06] | ACK |
| Data Byte 1 - Requestee's Address (Transmitter) | 1 byte | | |
| | | [0 x 06] | ACK |
| Data Byte 2 | 1 byte | | |
| | | [0 x 06] | ACK |
| Data Byte n | 1 byte | | |
| | | [0 x 06] | ACK |

TABLE 5-continued

Response to Request Sequence

Response to Request Sequence

| | Requestee | | Requestor |
|---|---|---|---|
| CRC MSB | 1 byte | | |
| | | [0 × 06] | ACK |
| CRC LSB | 1 byte | | |
| | | [0 × 06] | ACK |
| ETX | [0 × 03] | | |
| | | [0 × 06] | ACK |
| | | [0 × 06] | ACK |

Figure 3:
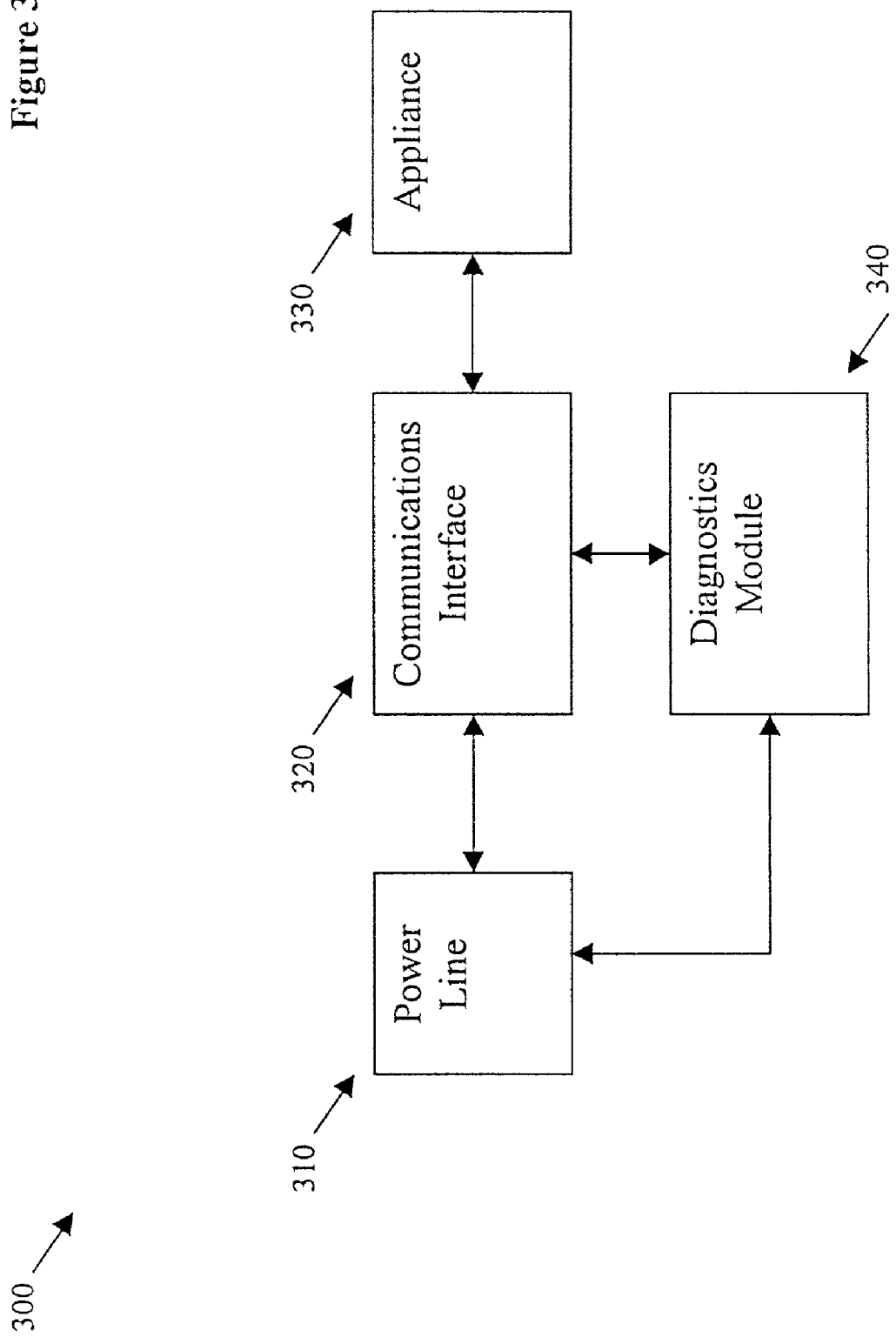
FIG. 3 depicts a system for communication and power line diagnostics between a power line carrier and an appliance.

FIG. 3 depicts a communication and power line diagnostics system 300. A preferred embodiment comprises a power line 310, a communications interface 320, an appliance 330, and a diagnostics module 340. In a preferred embodiment, the communications interface 320 functions as described above in reference to the communications interface 200 of FIG. 2. The diagnostics module 340 diagnoses the power line 310. As examples, the diagnostics module 340 measures the frequency of the power line 310 and measures the voltage of the power line 310. The diagnostics module 340 may further measure the average voltage of the power line 310 over time and detects ground faults in the line 310. Furthermore, the diagnostics module 340 records power failures and detects line sag.

Figure 4:
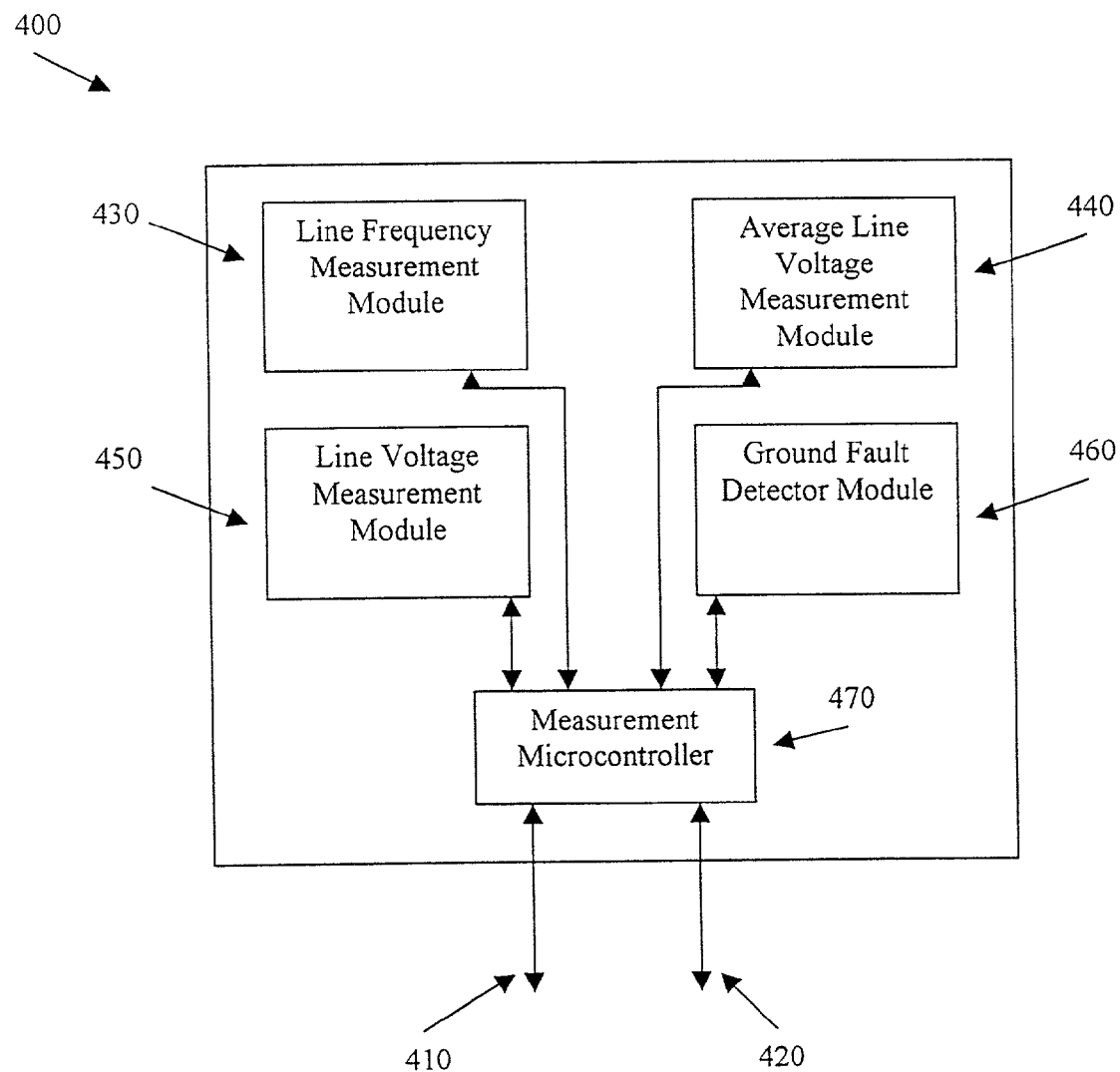
FIG. 4 presents a power line carrier diagnostics module.

FIG. 4 presents an implementation of a power line carrier diagnostics module 400. The power line carrier diagnostics module 400 comprises a power line connection 410, a communications interface connection 420, a line frequency measurement module 430, an average line voltage measurement module 440, a line voltage measurement module 450, a ground fault detector module 460, and a measurement microcontroller 470. The line frequency measurement module 430 may be implemented with a phased lock loop that drives an analog to digital converter. The average line voltage measurement module 440 may be implemented with an integration circuit driving an analog to digital converter. The line voltage measurement module 450 may be implemented with a resistive divider circuit driving an analog to digital converter. The ground fault detector module 360 may be implemented with a current sensor driving an analog to digital converter. The measurement microcontroller 470 may be implemented using a Hitachi H8-3644 microcontroller. It is understood that appropriate software modules process the hardware mentioned above and are tailored to meet the overall diagnostics module requirements.

Transmission over a power line may be affected by may problems such as signal attenuation-impedance effects, inference (such as white noise, impulse noise, continuous wave sources, and the like), line conditions that may vary over time, and the like. Multiple paths within a power system to any given point may result in signal interference. Noise on the power line may also cause signal interference and disruption. The PLC technique noted above, however, monitors transmission status and resumes an interrupted signal transmission.

Preferably, data is transmitted by modulating the data on a high frequency carrier above the power line carrier. In a preferred embodiment, the modulated data is a sinusoidal wave that is transmitted along with AC power through the power lines. The high frequency carrier is usually between 100–400 kHz to keep it below the range of FCC regulation.

The PLC may be implemented as an X10 module as explained in detail at wwwv.x10.com, or as CEBUS modules provided by Domosys.

Figure 5:
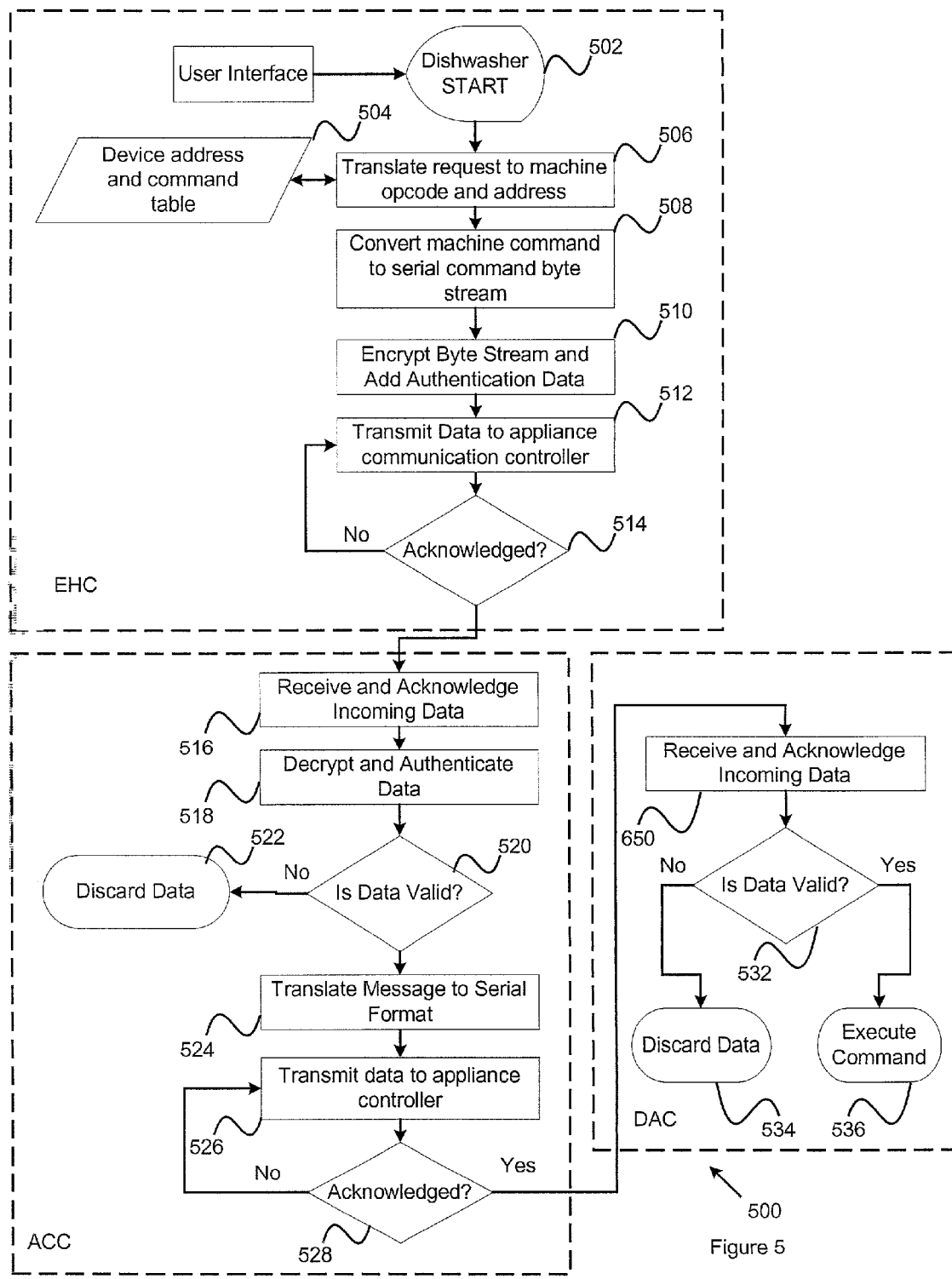
FIG. 5 shows a flow diagram of a method for translating between a power line carrier communication protocol and an appliance communication protocol.

FIG. 5 shows a flow diagram 500 of a method that the communication processor 245 may use for translating between a power line carrier communication protocol and an appliance communication protocol. In one embodiment, the user runs an application on the EHC 160 which has been developed to manipulate the appliances within the home. In an alternative embodiment the user application runs on a remote system which will have a communications link to the EHC 160. The user selects the appropriate command (e.g., Dishwasher START) 502 using the EHC 160. The EHC 160 through its application program, interprets the request and obtains the machine specific command from the device information table 504. Once the appropriate command has been obtained (506) from the table 504, the EHC 160 generates a message packet including the machine command and device address (step 508). The EHC 160 will further apply authentication data and encrypt (510) the data prior to transmission of the message packet to the communication interface 120. The EHC 160 converts the encrypted data to electrical signals and transmits (512) the electrical signals via the PLC communication link. The EHC 160 monitors the transmission of the data packet to the communication interface 120 and checks (514) for an acknowledgment that the data has been received correctly by the communication interface 120. If the acknowledgment is not received in the time frame specified by the communication protocol, the data will be retransmitted by the EHC 160.

In the preferred embodiment, the communication interface 120 will accept and acknowledge the incoming data transmission from the EHC 160. In doing so the electrical signals will be converted (516) back to a logical data packet. The communication interface 120 will then employ the appropriate algorithms to decrypt and authenticate (518) the received data packet. In circumstances where the communication interface 120 is not able to authenticate the data packet, or finds the data packet to be invalid (520), the data packet will be discarded (522) and a request for a retransmission may be sent back to the EHC 160. Following a successful authentication of a data packet by the communication interface 120, the communication interface 120 will reformat (524) the data for serial transmission. The data is then converted to electrical signals and transmitted (526) via the serial bus. The communication interface 120 monitors (528) the transmission of the data packet to the DAC and monitors for acknowledgment of the data being received correctly.

At the receiving end of the communication line, the digital appliance controller (DAC) converts the electrical signals from the communication interface 120 to logical information. Once the DAC has accepted (530) the logical signals and has confirmed (532) the validity of the data, an acknowledgement is transmitted back to the communication interface 120 to complete the data exchange. The DAC then interprets the data within the data packet. If the data contains a valid command then the DAC will execute (534) the machine command accordingly. If the command is determined not to be valid then the request is discarded (536).

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope.

Therefore, it is intended that the invention not be limited to the particular embodiment disclosed, but that the invention will include all embodiments falling within the scope of the appended claims.

What is claimed is:

1. A communication and power line diagnostics system comprising:
   a communication interface for interfacing an appliance with a power line carrier communication system, said communication interface comprising:
      at least one power line connection for coupling said communication interface to a power line;
      at least one appliance communication connection for coupling said communication interface to the appliance; and
      processing circuitry for receiving a power line carrier transmission and translating the power line carrier transmission between a power line carrier communication protocol and an appliance communication protocol; and
   a diagnostics module configured to diagnose the power line, said diagnostics module comprising a power line measurement connection for coupling said diagnostics module to the power line, said diagnostics module configured to detect a power line sag, detect and record power failures, measure a power line frequency and measure an average power line voltage, said diagnostics module responsive to at least one of the conditions.

2. The system of claim 1, wherein said processing circuitry comprises a signal processor for receiving the power line carrier transmission and a communications processor for translating to the appliance communications protocol.

3. The system of claim 1 wherein said appliance communication connection is a serial bus connection.

4. The system of claim 1 wherein said appliance communication connection comprises a bidirectional appliance communication connection.

5. The system of claim 1 wherein said power line connection comprises a bidirectional power line carrier connection.

6. The system of claim 1 wherein said appliance communication connection comprises a signal line and a signal ground line.

7. The system of claim 1 further comprising a message buffer for storing a plurality of power line carrier transmissions.

8. The system of claim 1 wherein said processing circuitry further comprises a general purpose universal asynchronous receiver transmitter (UART).

9. The system of claim 1 wherein said power line connection comprises at least one of a 120V or 240V power line connection.

10. A method of communicating data between an appliance and a power line carrier using a communication interface, comprising:
    interfacing the communication interface with the power line carrier;
    interfacing the communication interface with the appliance;
    diagnosing the power line carrier with a diagnostics module configured to detect a power line sag, detect and record power failures, measure a power line frequency and measure an average power line voltage, the diagnostics module responsive to at least one of the conditions, and configured to interface with the power line carrier and the communication interface;
    receiving at the communication interface a power line carrier transmission over the power line carrier; and
    transmitting the power line carrier transmission between a power line carrier communication protocol and an appliance communication protocol.

11. The method of claim 10 wherein said step of interfacing with an appliance comprises serially interfacing.

12. The method of claim 10 wherein said step of interfacing with an appliance comprises bidirectionally interfacing.

13. The method of claim 10 wherein said step of interfacing with a power line carrier comprises bidirectionally interfacing.

14. The method of claim 10 further comprising buffering a plurality of power line carrier transmissions.

15. The method of claim 10 wherein said step of interfacing with a power line carrier comprises interfacing with at least one of a 120V and 240V AC power line carrier.

* * * * *